Patented Nov. 21, 1922.

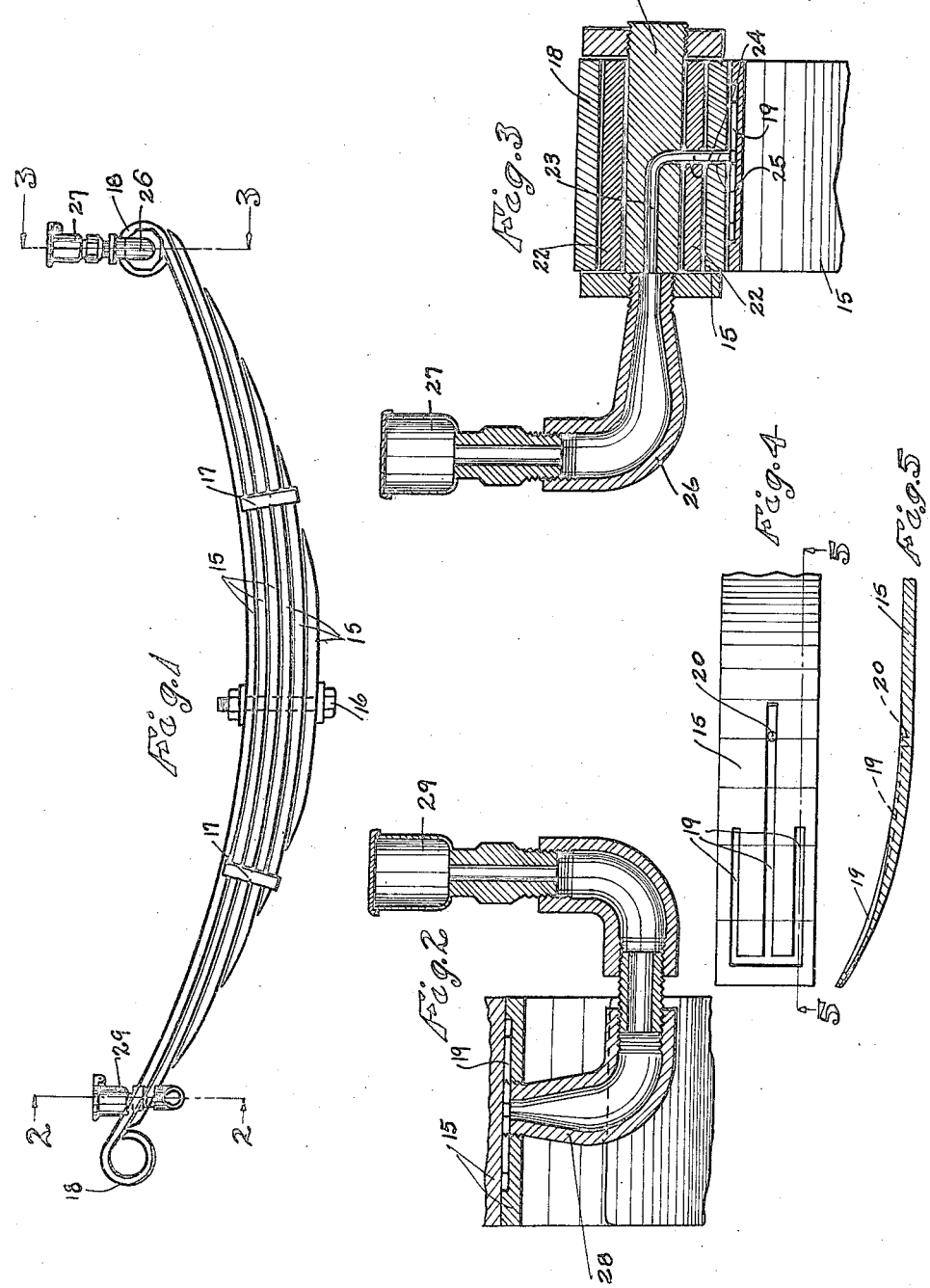

1,436,012

UNITED STATES PATENT OFFICE.

MARTIN CESAK, OF BERWYN, ILLINOIS.

OILING SYSTEM FOR VEHICLE SPRINGS.

Application filed October 15, 1920. Serial No. 417,076.

*To all whom it may concern:*

Be it known that I, MARTIN CESAK, a citizen of the United States, and a resident of the city of Berwyn, county of Cook, and State of Illinois, have invented certain new and useful Improvements in Oiling Systems for Vehicle Springs, of which the following is a specification.

My invention relates to new and useful improvements in oiling systems for vehicle springs, and has for its principal object the provision of a new and improved construction and arrangement of parts by which an improved oiling effect shall be attained assuring a complete lubrication of all engaging parts.

Other objects will appear hereinafter.

The invention consists in the combinations and arrangements of parts hereinafter described and claimed.

The invention will be best understood by reference to the accompanying drawings forming a part of this specification, and in which, Fig. 1, is a side view of one form of my improved construction, Fig. 2, an enlarged detail view of the construction at one end of the spring, being substantially a section taken on line 2—2 of Fig. 1, Fig. 3, an enlarged detail view of the construction at the opposite end, being substantially a section taken on Fig. 3—3 of Fig. 1.

Fig. 4, a top plan view of the end portion of one of the intermediate leaves of the spring, and Fig. 5, a section taken on line 5—5 of Fig. 4.

Referring to the drawings 15 indicates a plurality of superposed leaves forming a spring of an ordinary type, the leaves being curved downwardly between their ends, and each leaf being shorter than the leaf next above it. A bolt 16 is provided connecting the springs together at their middle points, and clips 17 are provided for holding the leaves against lateral movement with respect to each other. Eyes or rings 18 are provided on the end portions of the uppermost leaf 15 for mounting the spring in position.

As is best shown in Fig. 4, each of the intermediate leaves 15 of the spring is provided upon the end portions of its upper face with a plurality of longitudinally extending groove portions 19 connected at their upper ends by means of a lateral groove portion. An opening 20 is also provided through the leaf, in position to communicate at its upper end with the longitudinally extending groove 19, as is shown in Fig. 4. By the provision of the grooves 19, the oil which is deposited upon the upper face of the spring near its outer end, is adapted to be directed along the spring so as to be carried to the desired point for lubrication. The opening 20 through each of the leaves is so positioned as to communicate, at its lower end, with the groove 19 formed in the upper face of the leaf next below, whereby the oil delivered to the upper face of the uppermost intermediate leaf is distributed by means of the grooves 19 and the opening 20 to the upper faces of all of the several leaves of the spring.

The means for delivering the oil to the end portion of the upper face of the uppermost intermediate leaf, as such oil delivering means is constructed, as shown at the right-hand end portion of Fig. 1, comprises a bolt 21 mounted in the eye 18, a brass bushing 22 being interposed between the bolt and the eye 18. The bolt 21 is provided with a central opening 23 at one end, which is turned at an angle at about the middle portion of the bolt, so as to communicate with openings 24 and 25 through the bushing 22, and the uppermost leaf 15 of the spring, respectively, the lower end of the opening 25 being directly above the groove 19 of the uppermost intermediate leaf 15. A hollow stem 26 is mounted, by means of screw threads, in the head of the bolt 21 so as to communicate with the opening 23, an oil cup 27, of any approved type, being mounted upon the outer turned up end of the stem 26.

The construction at the opposite end of the spring is slightly different. At this point a hollow stem 28 is tapped directly into the lower face of the uppermost intermediate leaf 15, the stem 28 being connected at its outer end with an oil cup 29 which is held in elevated position so as to secure a delivery of oil upwardly through the end of the stem 28 to the upper face of the leaf upon which it is mounted, the stem being mounted in such position as to deliver the oil to the groove 19 in such leaf.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A spring comprising a plurality of superposed leaves; a hollow stem tapped upwardly through the end portion of the uppermost intermediate leaf; and an oil cup connected with said stem in position for delivering oil by gravity upwardly through the stem, said leaf being provided with a plurality of longitudinally extending groove portions in its upper face at the point where the oil is deposited from said oil cup for directing the oil along the leaf to the desired point for lubrication, substantially as described.

2. A spring comprising a plurality of superposed leaves; a curved hollow stem tapped through the end portion of the uppermost intermediate leaf; and an oil cup connected with said stem and mounted above the same in position for delivering oil upwardly through the stem, each of said intermediate leaves being provided with a longitudinally extending groove and two groove portions parallel thereto and connected therewith by means of a lateral groove portion in the upper face of the leaf at the point where the oil is delivered thereto for directing the oil along the leaf to the desired place for lubrication, substantially as described.

In testimony whereof I have signed my name to this specification in the presence of two subscribing witnesses.

MARTIN CESAK.

Witnesses:
JOSHUA R. H. POTTS,
ROSE K. TRIB.